United States Patent
Lu et al.

(10) Patent No.: US 10,285,119 B2
(45) Date of Patent: May 7, 2019

(54) ELECTRONIC DEVICE AND ASSESSMENT METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Bai-Yan Guan, Shenzhen (CN); Zhi-Lin Mao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/802,463

(22) Filed: Nov. 3, 2017

(65) Prior Publication Data
US 2019/0069223 A1    Feb. 28, 2019

(51) Int. Cl.
| | |
|---|---|
| *H04B 5/00* | (2006.01) |
| *H04W 48/16* | (2009.01) |
| *H04W 48/08* | (2009.01) |
| *H04W 84/12* | (2009.01) |
| *H04W 8/00* | (2009.01) |
| *H04W 4/80* | (2018.01) |

(52) U.S. Cl.
CPC ........ *H04W 48/16* (2013.01); *H04B 5/0031* (2013.01); *H04W 4/80* (2018.02); *H04W 8/005* (2013.01); *H04W 48/08* (2013.01); *H04W 84/12* (2013.01)

(58) Field of Classification Search
CPC ........ H04W 4/80; H04W 4/06; H04W 4/008; H04W 4/023; H04W 88/02; H04W 40/00; H04W 76/10; H04W 8/22
USPC ...................................................... 455/41.1
See application file for complete search history.

(56) References Cited

U.S. PATENT DOCUMENTS

| | | | | |
|---|---|---|---|---|
| 2006/0068785 | A1* | 3/2006 | Kamijo | ............... H04L 63/0272 455/435.1 |
| 2013/0041959 | A1* | 2/2013 | Bengtsson | ............... H04L 51/14 709/206 |
| 2014/0003730 | A1* | 1/2014 | Tanaka | .................... G06F 3/017 382/224 |

* cited by examiner

*Primary Examiner* — Ajibola A Akinyemi
(74) *Attorney, Agent, or Firm* — ScienBiziP, P.C.

(57) ABSTRACT

A recognizing method includes establishing a communication connection between each electronic device and one or more wireless devices. Connection information when each electronic device communicates with one or more wireless devices is recorded in a server. The server determines a degree of similarity between two electronic devices according to the connection information and pushes user information of one of the two electronic devices to another when the degree of similarity is greater than a preset degree of similarity.

5 Claims, 5 Drawing Sheets

FIG. 1

| A number of same WiFi devices \ Time length/min \ Degree of similarity | 0 - 100 | 101 - 300 | 401 - 800 | 801 - 1200 | 1201 - ∞ |
|---|---|---|---|---|---|
| 0 - 2 | 0 | 50 | 80 | 100 | 100 |
| 3 | 20 | 60 | 100 | 100 | 100 |
| 4 | 30 | 70 | 100 | 100 | 100 |
| 5 - ∞ | 40 | 100 | 100 | 100 | 100 |

FIG. 2

| Time length/min<br>Degree of similarity<br>A number of times | 0 - 60 | 61 - 120 | 121 - 180 | 180 - 240 | 241 - ∞ |
|---|---|---|---|---|---|
| 0 - 10 | 0 | 50 | 80 | 100 | 100 |
| 11 - 20 | 20 | 60 | 100 | 100 | 100 |
| 21 - 30 | 30 | 70 | 100 | 100 | 100 |
| 31 - ∞ | 40 | 100 | 100 | 100 | 100 |

FIG. 3

| a number of times | Degree of similarity |
|---|---|
| 0 - 20 | 20 |
| 21 - 40 | 40 |
| 41 - 60 | 60 |
| 61 - 80 | 80 |
| 80 - ∞ | 100 |

This application claims priority to Chinese Patent Application No. 201710776082.2 filed on Aug. 31, 2017, the contents of which are incorporated by reference herein.

ELECTRONIC DEVICE AND ASSESSMENT METHOD

CROSS-REFERENCE TO RELATED APPLICATIONS

FIELD

The subject matter herein generally relates to managing technology, and particularly to an electronic device and a recognizing method.

BACKGROUND

Generally, a user of an electronic device such as a mobile device may use a social software to communicate with others. However, when a new contact requests for establishing communication with the user through the social software, the user may be unsure whether to accept the request or not.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
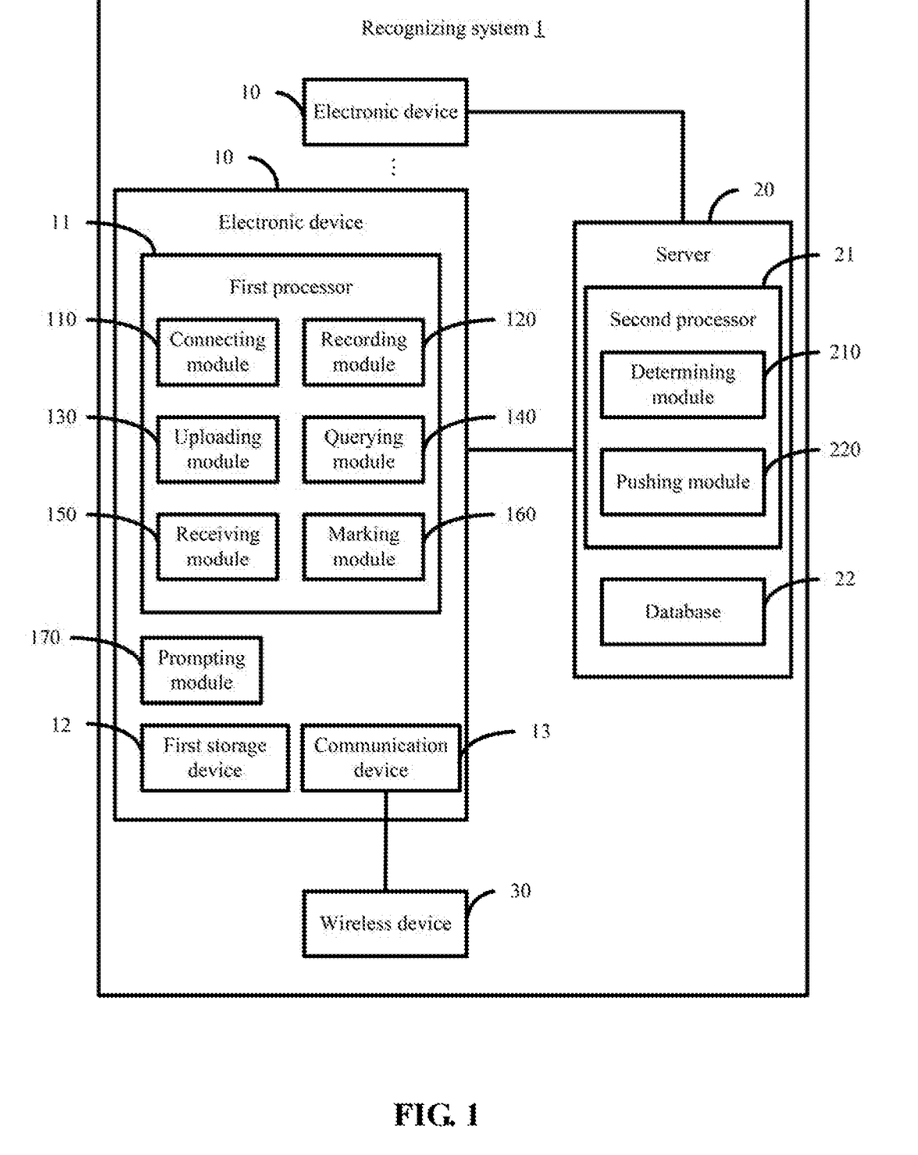
FIG. 1 is a block diagram of one exemplary embodiment of a plurality of electronic devices in communication with a wireless device and a server.

FIG. 1 illustrates an exemplary embodiment of a recognizing system 1. Depending on the exemplary embodiment, the recognizing system 1 is applied to an operating environment that is established by a plurality of electronic devices 10 and a server 20. In at least one exemplary embodiment, the plurality of electronic devices 10 can be mobile phones or personal computers. The server 20 can be a cloud server which can communicate with the plurality of electronic devices 10 through the Internet or the local area network (LAN).

In at least one exemplary embodiment, each electronic device 10 can include, but is not limited to, a first processor 11, a first storage device 12, and a communication device 13. The electronic device 10 can communicate with one or more wireless devices 30 using the communication device 13. In at least one exemplary embodiment, the communication device 13 can be a Wi-Fi module, a BLUTOOTH™ module, a radio frequency identification (RFID) module, or a combination thereof.

In at least one exemplary embodiment, the wireless device 30 can be a device configured with the Wi-Fi module named as a Wi-Fi device. In other exemplary embodiments, the wireless device 30 can be a device configured with the BLUTOOTH module named as a BLUTOOTH device, or a device configured with the RFID module named as an RFID device. For example, the wireless device 30 can be a wireless router, a mobile phone, a computer, or an RFID scanner. The first storage device 12 can be used to store connection information when the electronic device 10 communicates with the wireless device 30 using the communication device 13.

In at least one exemplary embodiment, the server 20 can include, but is not limited to, a second processor 21 and a database 22. In at least one exemplary embodiment, the database 22 can be used to store user information of each electronic device 10, and can be further used to store the connection information when each electronic device 10 communicates with the wireless device 30.

As shown in FIG. 1, each electronic device 10 can include, but is not limited to, a connecting module 110, a recording module 120, an uploading module 130. A server 20 can include, but is not limited to, a determining module 210, and a pushing module 220. In at least one exemplary embodiment, the connecting module 110, the recording module 120, and the uploading module 130 can include computerized codes in the form of one or more programs that may be stored in the first storage device 12. The computerized codes include instructions that can be executed by the first processor 11. The determining module 210 and the pushing module 220 can include computerized codes in the form of one or more programs that may be stored in the database 22 and can be executed by the second processor 21. The computerized codes include instructions that can be executed by the second processor 21. In other exemplary embodiment, the modules 110-130 can be program instructions or firmware integrated in the first processor 11, the modules 210-220 can be program instructions or firmware integrated in the second processor 21.

The connecting module 110 included in a certain electronic device 10 of the plurality of electronic devices 10 can detect the wireless device 30. It should be noted that the certain electronic device 10 can be any one of the plurality of electronic devices 10. When the wireless device 30 is detected, the connecting module 110 can establish a communication connection between the certain electronic device 10 and the wireless device 30 in response to user input.

In at least one exemplary embodiment, when the connecting module 110 detects that the wireless device 30 is the Wi-Fi device the connecting module 110 can establish the communication connection when a connecting password input by a user is received. The connecting password can be a password for accessing the Wi-Fi device.

In at least one exemplary embodiment, when the communication device 13 detects that the wireless device 30 is a Bluetooth device, the connecting module 110 can establish the communication connection when a pairing code for pairing the certain electronic device 10 and the wireless device 30 input by the user is received.

In at least one exemplary embodiment, when the communication device 13 detects that the wireless device 30 is an RFID scanner, the connecting module 110 can establish the communication connection when the certain electronic device 10 approaches the wireless device 30, i.e., when the certain electronic device 10 locates in a valid range of the RFID scanner.

The recording module 120 can record connection information when the certain electronic device 10 communicates with the wireless device 30.

In at least one exemplary embodiment, the connection information can include, but is not limited to, information of the wireless device 30, time information when the communication connection is established, and a number of times of the certain electronic device 10 establishes the communication connection with the wireless device 30.

In at least one exemplary embodiment, the information of the wireless device 30 can be an unique identification of the wireless device 30 or a name of the wireless device 30. The time information includes start time when each communication connection is established, finish time when each communication connection is disconnected, and a total length of communication time.

For example, an electronic device "A1" communicates with a wireless device "B1" three times. In a first time, the electronic device "A1" communicates with the wireless device "B1" for five minutes. In a second time, the electronic device "A1" communicates with the wireless device "B1" for ten minutes. In a third time, the electronic device "A1" communicates with the wireless device "B1" for five minutes. Then the total length of time of the electronic device "A1" communicating with the wireless device "B1" for the three times equals twenty minutes.

The uploading module 130 can upload the connection information together with user information of the certain electronic device 10 to the server 20.

In at least one exemplary embodiment, the uploading module 130 uploads the connection information and the user information of the certain electronic device 10 at preset time intervals (e.g., every week). For example, the uploading module 130 can upload the connection information corresponding to Friday to Sunday together with user information of the certain electronic device 10 at every Sunday.

In at least one exemplary embodiment, the user information of the certain electronic device 10 can include, but is not limited to, a picture of a user of the certain electronic device 10, a nickname of the user, a gender of the user, an age of the user, and a contact information of the user. The server 20 can store the connection information and the user information in the database 22.

Similarly, according to the above method, the database 22 can store the connection information when each of the plurality of electronic devices 10 communicates with the wireless device 30, and store the user information of each of the plurality of electronic devices 10.

The determining module 210 can determine a degree of similarity between two electronic devices 10 of the plurality of electronic devices 10 according to the connection information stored in the database 22.

Figure 2:
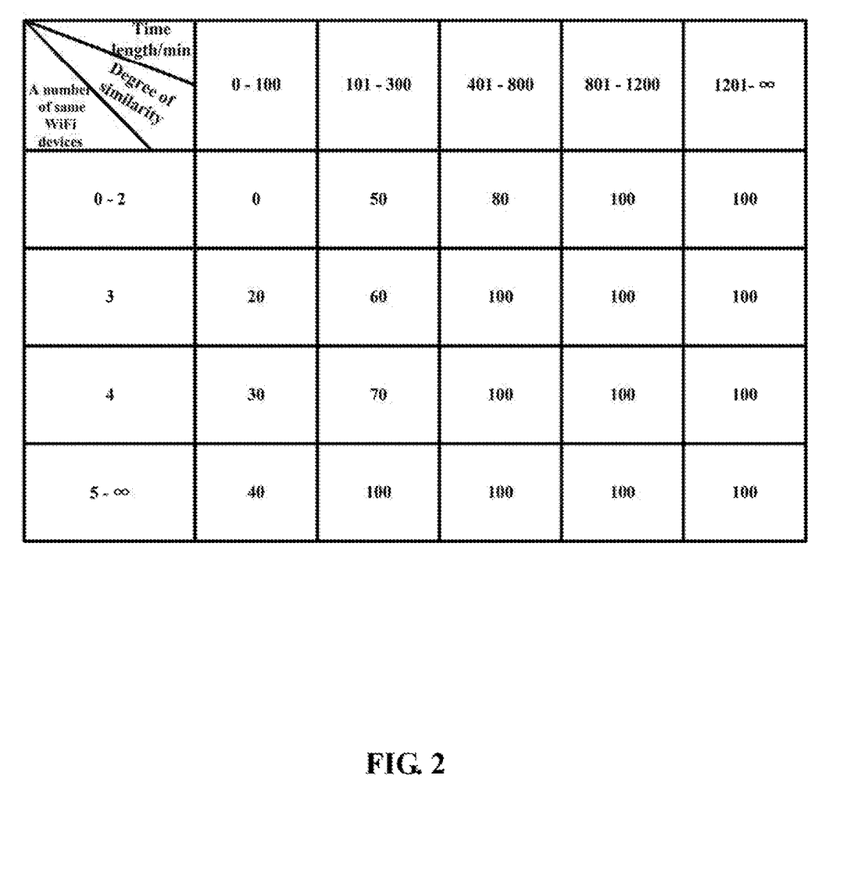
FIG. 2 illustrates one exemplary embodiment of a first table pre-stored in the server of FIG. 1.

In at least one exemplary embodiment, when the wireless device 30 is the Wi-Fi device, as shown in FIG. 2, the database 22 pre-stores a first table that lists different connection information corresponding to different degrees of similarity. In the first table, the degree of similarity between two electronic devices 10 is determined based on a number of same Wi-Fi devices with which both electronic devices 10 had a connection in a predetermined time period, and a total length of time of the two electronic device 10 being simultaneously in communication with the number of same Wi-Fi devices in the predetermined time period.

In at least one exemplary embodiment, the determining module 210 can determine the number of same Wi-Fi devices according to the information of the Wi-Fi devices included in the connection information corresponding to each electronic device 10.

For example, the connection information corresponding to a first electronic device "C1" may indicate that the first electronic device "C1" has ever connected with a first Wi-Fi device "W1", a second Wi-Fi device "W2", and a third Wi-Fi device "W3" between 8:00 am and 10:00 am on 2017 May 10. The connection information corresponding to a second electronic device "C2" indicates that the second electronic device "C2" has ever connected with the first Wi-Fi device "W1", the second Wi-Fi device "W2", and a fourth Wi-Fi device "W4" between 8:00 am and 10:00 am on 2017 May 10. That is, both of the first electronic device "C1" and the second electronic device "C2" have connected with two Wi-Fi devices between 8:00 am and 10:00 am on 2017 May 10, the two Wi-Fi devices being the first Wi-Fi device "W1" and the second Wi-Fi device "W2". Therefore, the determining module 210 can determine that the number of same Wi-Fi devices with which both of the first electronic device and the second electronic device have connected between 8:00 am and 10:00 am on 2017 May 10 is equal to two.

In at least one exemplary embodiment, the determining module 210 can determine the total length of time of the two electronic devices 10 being simultaneously communicating with the number of same Wi-Fi devices according to the time information included in the connection information corresponding to each electronic device 10.

For example, the connection information corresponding to the first electronic device "C1" may indicate that the first electronic device "C1" has connected with the first Wi-Fi device "W1" between 8:00 am and 10:00 am on 2017 May 10, that the first electronic device "C1" has connected with the second Wi-Fi device "W2" between 8:00 am and 9:00 am on 2017 May 10, and that the first electronic device "C1" has connected with the third Wi-Fi device "W3" between 8:00 am and 10:00 am on 2017 May 10. The connection information corresponding to the second electronic device "C2" indicates that the second electronic device "C2" has connected with the first Wi-Fi device "W1" between 8:00 am and 10:00 am on 2017 May 10, the second electronic device "C2" has connected with the second Wi-Fi device "W2" between 8:00 am and 9:10 am on 2017 May 10, and the second electronic device "C2" has connected with the fourth Wi-Fi device "W4" between 8:00 am and 10:00 am on 2017 May 10. That is, both the first electronic device "C1" and the second electronic device "C2" simultaneously connect with the first Wi-Fi device "W1" between 8:00 am and 10:00 am on 2017 May 10, i.e., both the first electronic device "C1" and the second electronic device "C2" simultaneously connected with the first Wi-Fi device "W1" for two hours. Further, both the first electronic device "C1" and the second electronic device "C2" simultaneously connected with the second Wi-Fi device "W2" between 8:00 am and 9:00 am on 2017 May 10, i.e., both the first electronic device "C1" and the second electronic device "C2" simultaneously connected with the second Wi-Fi device "W2" for one hour. Then the determining module 210 can determine that the total length of time of the first electronic device "C1" and the second electronic device "C2" being simultaneously in communication with the first Wi-Fi device "W1" and the second Wi-Fi device "W2" is equal to three hours. According to the first table as shown in FIG. 2, then the determining module 210 can determine that the degree of similarity between the first electronic device "C1" and the second electronic device "C2" is 50.

Figure 3:
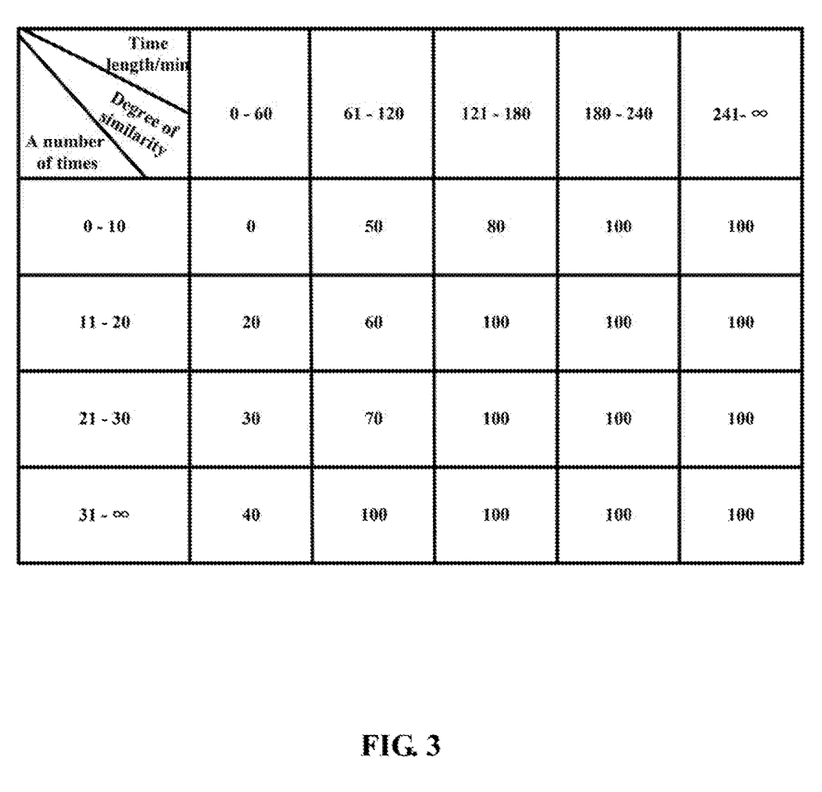
FIG. 3 illustrates one exemplary embodiment of a second table pre-stored in the server of FIG. 1.

In at least one exemplary embodiment, when the wireless device 30 is the Bluetooth device, as shown in FIG. 3, the database 22 pre-stores a second table that lists different connection information corresponding to different degrees of similarity. In the second table, the degree of similarity between two electronic devices 10 is determined based on a number of times of that communication is established between the two electronic devices 10 in a predetermined time period, and a total length of time of the two electronic device 10 being in communication with each other in the predetermined time period.

For example, the connection information corresponding to the first electronic device "C1" and the connection information corresponding to the second electronic device "C2" may indicate that the first electronic device "C1" and the second electronic device "C2" established communication connection between each other twice from 2017 Jun. 6 to 2017 Jun. 12. In a first time, the first electronic device "C1" and the second electronic device "C2" communicated with each other for 10 minutes, and in a second time, the first electronic device "C1" and the second electronic device "C2" communicated with each other for 20 minutes. That is, the determining module 210 can determine that the total length of time of the two electronic devices "C1" and "C2" being in communication with each other was for 30 minutes from 2017 Jun. 6 to 2017 Jun. 12. According to the second table as shown in FIG. 3, then the determining module 210 can determine that the degree of similarity between the first electronic device "C1" and the second electronic device "C2" is 0.

Figure 4:
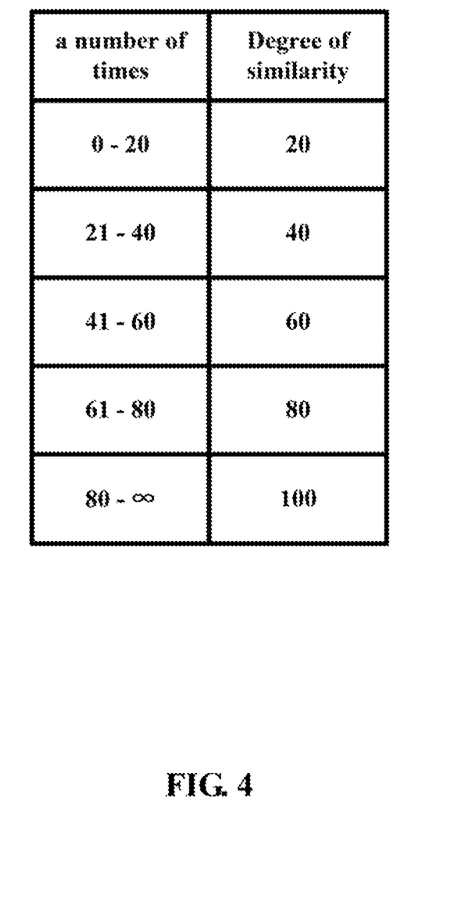
FIG. 4 illustrates one exemplary embodiment of a third table pre-stored in the server of FIG. 1.

In at least one exemplary embodiment, when the wireless device 30 is the RFID device, as shown in FIG. 4, the database 22 pre-stores a third table that lists different connection information corresponding to different degrees of similarity. In the third table, the degree of similarity between two electronic devices 10 is determined based on a number of times of the two electronic devices 10 being in communication with same RFID devices in a predetermined time period.

For example, the connection information corresponding to the first electronic device "C1" may indicate that the first electronic device "C1" has connected with a first RFID device "R1" 20 times from 9:00 am to 9:10 am on 2017 Jun. 16. Also, that the first electronic device "C1" has connected with a second RFID device "R2" 15 times from 9:00 am to 9:10 am on 2017 Jun. 16, and that the first electronic device "C1" has connected with a third RFID device "R3" 5 times from 9:00 am to 9:10 am on 2017 Jun. 16. The connection information corresponding to the second electronic device "C2" may indicate that the second electronic device "C2" has connected with the first RFID device "R1" 10 times from 9:00 am to 9:10 am on 2017 Jun. 16, that the second electronic device "C2" has connected with the second RFID device "R2" 15 times from 9:00 am to 9:10 am on 2017 Jun. 16, and that the second electronic device "C2" has connected with a fourth RFID device "R4" 10 times from 9:00 am to 9:10 am on 2017 Jun. 16. That is, both the first electronic device "C1" and the second electronic device "C2" have connected with two same RFID devices from 9:00 am to 9:10 am on 2017 Jun. 16, the two same RFID devices being the first RFID device "R1" and the second RFID device "R2". Therefore, the determining module 210 can determine that the number of times of the two electronic devices "C1" and "C2" communicating with the same RFID devices (i.e., the RFID devices "R1" and "R2") from 9:00 am to 9:10 am on 2017 Jun. 16 is 60 times. According to the third table as shown in FIG. 4, then the determining module 210 can determine that the degree of similarity between the first electronic device "C1" and the second electronic device "C2" is 60.

In at least one exemplary embodiment, when the connection information indicates that the two electronic devices 10 respectively communicate with two or more types of wireless devices (e.g., each of the two electronic devices 10 have communicated with the Wi-Fi device and the Bluetooth device), the determining module 210 can determine one degree of similarity based on the connection information when each of the two electronic devices 10 communicates with each type of wireless device, such that a plurality of degrees of similarity can be obtained. The determining module 210 can determine a highest degree of similarity from the plurality of degrees of similarity as the degree of similarity between the two electronic devices 10.

According to the above method of determining the degree of similarity between the two electronic devices 10, the determining module 210 can determine the degree of similarity between each two of the plurality of electronic devices 10.

The determining module 210 can determine whether the degree of similarity between the two electronic devices 10 is greater than a preset degree of similarity (e.g., 70). When the degree of similarity between the two electronic devices 10 is greater than the preset degree of similarity, the pushing module 220 included in the server 20 can push the user information of the two electronic devices 10 to each other.

For example, when the degree of similarity between the two electronic devices "C1" and "C2" is greater than 70, the pushing module 220 can push the user information of the first electronic device "C1" to the second electronic device "C2", and can push the user information of the second electronic device "C2" to the first electronic device "C1".

For definitely describing the present disclosure, when the degree of similarity between two electronic devices 10 is greater than the preset degree of similarity, one of the two electronic device 10 is named as a similar electronic device of the another electronic device 10. For example, when the degree of similarity between the first electronic device "C1" and the second electronic device "C2" is greater that the preset degree of similarity, the second electronic device "C2" can be named as the similar electronic device of the first electronic device "C1", and the first electronic device "C1" can be named as the similar electronic device of the second electronic device "C2". For a further example, when the degree of similarity between the first electronic device "C1" and a third electronic device "C3" is greater than the preset degree of similarity, the third electronic device "C3" can also be named as the similar electronic device of the first electronic device "C1", i.e., both the second electronic device "C2" and the third electronic device "C3" are the similar electronic devices of the first electronic device "C1". Also, the first electronic device "C1" can be named as the similar electronic device of the third electronic device "C3".

In at least one exemplary embodiment, each electronic device 10 can further include a querying module 140, a receiving module 150, a marking module 160, and a prompting module 170. The querying module 140, the receiving module 150, the marking module 160, and the prompting module 170 can include computerized codes in the form of one or more programs that may be stored in the first storage device 12. The computerized codes include instructions that can be executed by the first processor 11.

The querying module 140 included in the certain electronic device 10 can query the user information of the similar electronic device 10 of the certain electronic device 10 from the server 20. In at least one exemplary embodiment, the querying module 140 can query the user information of the similar electronic device 10 of the certain electronic device 10 in response to user input. For example, the querying module 140 can query the user information of the similar electronic device 10 of the certain electronic device 10 according to the gender and/or the nickname input by a user. The receiving module 150 included in the certain electronic device 10 can obtain the user information of the similar electronic device 10 of the certain electronic device 10 from the server 20.

The marking module 160 included in the certain electronic device 10 can add marking for the obtained user information. In at least one exemplary embodiment, the marking module 160 can add the marking in response to user input. For example, the marking may be text information such as "a family", "a friend", "a classmate", or "a co-worker".

When the certain electronic device 10 receives an incoming call from the similar electronic device 10 of the certain electronic device 10, the prompting module 170 included in the certain electronic device 10 can transmit a prompt by displaying, on the certain electronic device 10, the user information of the similar electronic device 10, the degree of similarity between the similar electronic device 10 and the certain electronic device 10, and the marking.

Figure 5:
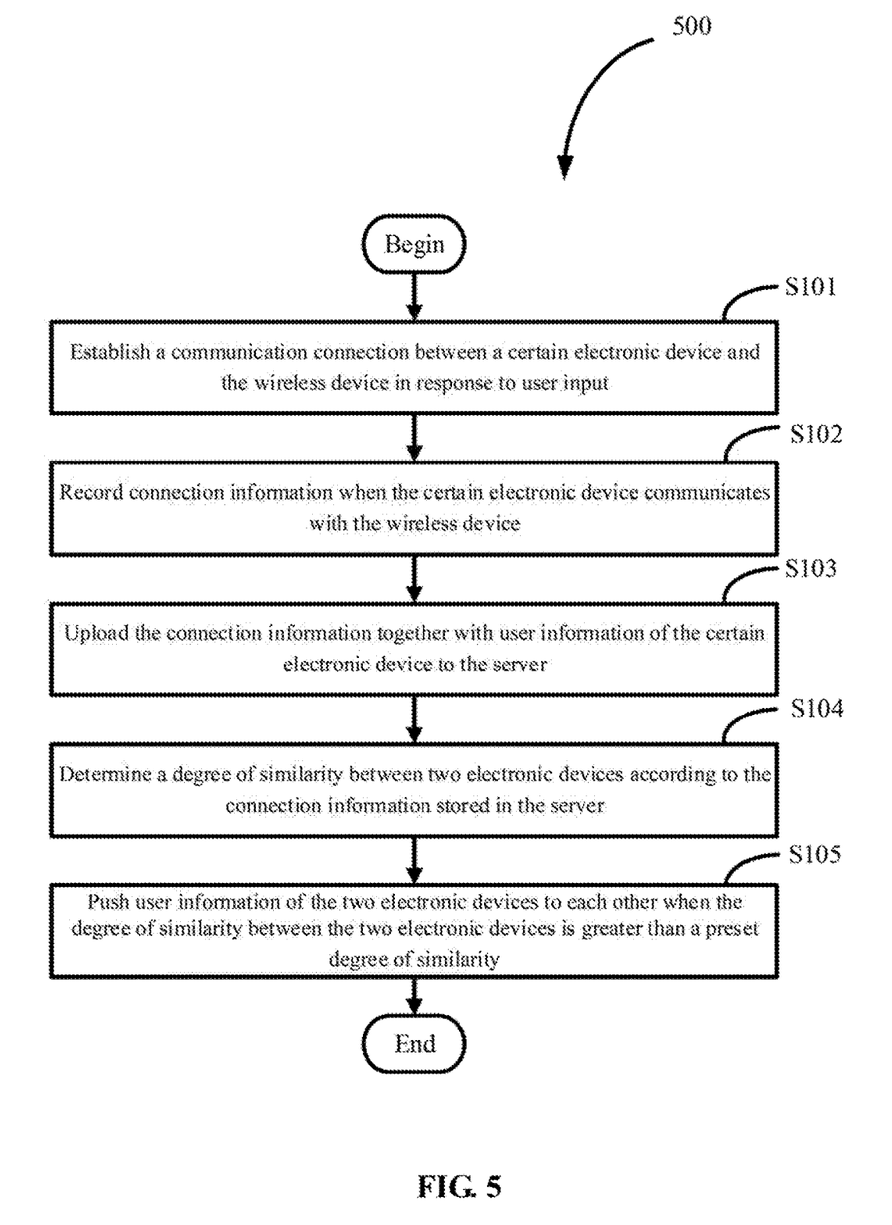
FIG. 5 illustrates a flow chart of one exemplary embodiment of a method of determining a degree of similarity between two electronic devices.

FIG. 5 illustrates a flowchart which is presented in accordance with an example embodiment. The exemplary method 500 is provided by way of example, as there are a variety of ways to carry out the method. The method 500 described below can be carried out using the configurations illustrated in FIG. 1, for example, and various elements of these figures are referenced in explaining exemplary method 500. Each block shown in FIG. 5 represents one or more processes, methods, or subroutines, carried out in the exemplary method 500. Additionally, the illustrated order of blocks is by example only and the order of the blocks can be changed. The exemplary method 500 can begin at block S101. Depending on the embodiment, additional steps can be added, others removed, and the order of the steps can be changed.

At block S101, the connecting module 110 can detect the wireless device 30. When the wireless device 30 is detected, the connecting module 110 can establish a communication connection between a certain electronic device 10 and the wireless device 30 in response to a user input. The certain electronic device 10 can be any one of the plurality of electronic devices 10.

At block S102, the recording module 120 can record connection information when the certain electronic device 10 communicates with the wireless device 30.

At block S103, the uploading module 130 can upload the connection information together with user information of the certain electronic device 10 to the server 20.

The server 20 can store the connection information and the user information in the database 22.

In at least one exemplary embodiment, the uploading module 130 uploads the connection information and the user information of the certain electronic device 10 at preset time intervals (e.g., every week). For example, the uploading module 130 can upload the connection information corresponding to Friday to Sunday together with user information of the certain electronic device 10 at every Sunday.

Similarly, according to the above steps S101-S103, the database 22 can store the connection information when each of the plurality of electronic devices 10 communicates with the wireless device 30, and store the user information of each of the plurality of electronic devices 10.

At block S104, the determining module 210 can determine the degree of similarity between two electronic devices 10 of the plurality of electronic devices 10 according to the connection information stored in the server 20.

At block S105, when the degree of similarity between the two electronic devices 10 is greater than the preset degree of similarity, the pushing module 220 included in the server 20 can push the user information of the two electronic devices 10 to each other.

In at least one exemplary embodiment, when the degree of similarity between two electronic devices 10 is greater than the preset degree of similarity, one of the two electronic devices 10 is determined as the similar electronic device of the another electronic device 10.

For example, when the degree of similarity between the first electronic device "C1" and the second electronic device "C2" is greater that the preset degree of similarity, the second electronic device "C2" can be determined as the similar electronic device of the first electronic device "C1", and the first electronic device "C1" can be determined as the similar electronic device of the second electronic device "C2". For a further example, when the degree of similarity between the first electronic device "C1" and a third electronic device "C3" is greater than the preset degree of similarity, the third electronic device "C3" can also be named as the similar electronic device of the first electronic device "C1", i.e., both the second electronic device "C2" and the third electronic device "C3" are the similar electronic devices of the first electronic device "C1". Also, the first electronic device "C1" can be named as the similar electronic device of the third electronic device "C3".

In at least one exemplary embodiment, the querying module 140 included in the certain electronic device 10 can query the user information of the similar electronic device 10 of the certain electronic device 10 from the server 20.

In at least one exemplary embodiment, the querying module 140 can query the user information of the similar electronic device 10 of the certain electronic device 10 in response to user input. For example, the querying module 140 can query the user information of the similar electronic device 10 of the certain electronic device 10 according to the gender and/or the nickname input by a user.

The receiving module 150 included in the certain electronic device 10 can obtain the user information of the similar electronic device 10 of the certain electronic device 10 from the server 20.

The marking module 160 included in the certain electronic device 10 can add a mark for the obtained user information. In at least one exemplary embodiment, the marking module 160 can add the mark in response to user input. For example, the mark may be text information such as "a family", "a friend", "a classmate", or "a co-worker'.

When the certain electronic device 10 receives an incoming call from the similar electronic device 10 of the certain electronic device 10, the prompting module 170 included in the certain electronic device 10 can transmit a prompt by displaying, on the certain electronic device 10, the user information of the similar electronic device 10, the degree of similarity between the similar electronic device 10 and the certain electronic device 10, and the remark.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A recognizing method applied to a plurality of electronic devices, the method comprising:
   establishing a communication connection between each of the plurality of electronic devices and one or more wireless devices;
   recording connection information when each of the plurality of electronic devices communicates with the one or more wireless devices;
   storing the connection information and user information of each of the plurality of electronic devices;
   determining a degree of similarity between two electronic devices of the plurality of electronic devices according to the connection information, wherein the connection information comprises information of the one or more wireless device, time information when the communication connection is established, and a number of times of each of the plurality of electronic devices establishes the communication connection with the one or more wireless devices; and
   pushing the user information of one of the two electronic devices to another one of the two electronic devices when the degree of similarity is greater than a preset degree of similarity;
   wherein the method further comprising:
   pre-storing a first table that lists different connection information corresponding to different degrees of similarity, wherein the degree of similarity between two electronic devices in the first table is determined based on a number of same wireless devices with which both of the two electronic devices ever connected in a predetermined time period, and a total length of time of the two electronic devices being simultaneously communicating with the number of same Wi-Fi devices in the predetermined time period.

2. The recognizing method according to claim 1, further comprising:
   querying, from a server, the user information of each of the plurality of electronic devices in response to user input.

3. The recognizing method according to claim 1, further comprising:
   adding a remark for the pushed user information; and
   when the one of the two electronic devices receives an incoming call from the another one of the two electronic devices, transmitting a prompt by displaying the pushed user information, the degree of similarity between the two electronic devices, and the remark.

4. A recognizing method applied to a plurality of electronic devices, the method comprising:
   establishing a communication connection between each of the plurality of electronic devices and one or more wireless devices;
   recording connection information when each of the plurality of electronic devices communicates with the one or more wireless devices;
   storing the connection information and user information of each of the plurality of electronic devices;
   determining a degree of similarity between two electronic devices of the plurality of electronic devices according to the connection information, wherein the connection information comprises information of the one or more wireless device, time information when the communication connection is established, and a number of times of each of the plurality of electronic devices establishes the communication connection with the one or more wireless devices; and
   pushing the user information of one of the two electronic devices to another one of the two electronic devices when the degree of similarity is greater than a preset degree of similarity;
   wherein the method further comprising:
   pre-storing a second table that lists different connection information corresponding to different degrees of similarity, wherein the degree of similarity between two electronic devices in the second table is determined based on a number of times of establishing the communication connection between the two electronic devices in a predetermined time period, and a total length of time of the two electronic devices being communicating with each other in the predetermined time period.

5. A recognizing method applied to a plurality of electronic devices, the method comprising:
   establishing a communication connection between each of the plurality of electronic devices and one or more wireless devices;
   recording connection information when each of the plurality of electronic devices communicates with the one or more wireless devices;
   storing the connection information and user information of each of the plurality of electronic devices;
   determining a degree of similarity between two electronic devices of the plurality of electronic devices according to the connection information, wherein the connection information comprises information of the one or more wireless device, time information when the communication connection is established, and a number of times of each of the plurality of electronic devices establishes the communication connection with the one or more wireless devices; and pushing the user information of one of the two electronic devices to another one of the two electronic devices when the degree of similarity is greater than a preset degree of similarity;

wherein the method further comprising:

pre-storing a third table that lists different connection information corresponding to different degrees of similarity, wherein the degree of similarity between two electronic devices in the third table is determined based on a number of times of the two electronic devices communicating with same wireless devices in a predetermined time period.

* * * * *

UNITED STATES PATENT AND TRADEMARK OFFICE
CERTIFICATE OF CORRECTION

PATENT NO. : 10,285,119 B2
APPLICATION NO. : 15/802463
DATED : May 7, 2019
INVENTOR(S) : Xin Lu et al.

Page 1 of 1

It is certified that error appears in the above-identified patent and that said Letters Patent is hereby corrected as shown below:

On the Title Page

Add item (30) regarding "Foreign Application Priority Data" with the following:
(30) Foreign Application Priority Data
Aug 31, 2017 (CN)............................ 201710776082.2

Signed and Sealed this
Thirty-first Day of December, 2019

Andrei Iancu
*Director of the United States Patent and Trademark Office*